United States Patent
Tenzer

(10) Patent No.: US 8,635,189 B1
(45) Date of Patent: Jan. 21, 2014

(54) FRAMEWORKS FOR PROVIDING BACKUP FUNCTIONALITIES TO DIFFERENT APPLICATIONS

(75) Inventor: Keith J. Tenzer, Munich (DE)

(73) Assignee: NetApp, Inc., Sunnyvale, CA (US)

( * ) Notice: Subject to any disclaimer, the term of this patent is extended or adjusted under 35 U.S.C. 154(b) by 233 days.

(21) Appl. No.: 12/765,231

(22) Filed: Apr. 22, 2010

(51) Int. Cl.
*G06F 7/00* (2006.01)
*G06F 17/00* (2006.01)

(52) U.S. Cl.
USPC ........... 707/654; 707/639; 707/640; 709/223; 709/224; 709/217

(58) Field of Classification Search
None
See application file for complete search history.

(56) References Cited

U.S. PATENT DOCUMENTS

| | | | |
|---|---|---|---|
| 7,366,742 B1 * | 4/2008 | Umbehocker et al. ................ | 1/1 |
| 2003/0217264 A1 | 11/2003 | Martin et al. | |
| 2005/0160118 A1 * | 7/2005 | Berkowitz et al. ............ | 707/204 |
| 2005/0260989 A1 * | 11/2005 | Pourtier et al. ............ | 455/435.3 |
| 2007/0112836 A1 * | 5/2007 | Lanzatella et al. ............ | 707/102 |
| 2008/0172414 A1 * | 7/2008 | Tien et al. .................. | 707/104.1 |
| 2009/0112948 A1 * | 4/2009 | Nguyen et al. ................ | 707/204 |
| 2009/0240724 A1 | 9/2009 | Das et al. | |
| 2010/0011178 A1 | 1/2010 | Feathergill | |
| 2010/0057826 A1 | 3/2010 | Chow et al. | |
| 2010/0235493 A1 | 9/2010 | Besaw et al. | |
| 2011/0246308 A1 * | 10/2011 | Segall et al. ............... | 705/14.66 |

OTHER PUBLICATIONS

Office Action mailed May 22, 2013, for related U.S. Appl. No. 13/239,188, filed Sep. 21, 2011, 16 Pages.

* cited by examiner

*Primary Examiner* — Dunk K Chau
(74) *Attorney, Agent, or Firm* — Mahamedi Paradice Kreisman LLP

(57) ABSTRACT

Example embodiments provide various techniques for providing a backup functionality to a particular application. In one example, a plug-in module is selected for activation from a number of different plug-in modules. This selected plug-in module is adapted to interface with the particular application. It should be noted that each plug-in module is adapted to interface with a different application. The particular application is quiesced using the selected plug-in module. After the application has been quiesced, the backup functionality is initiated.

20 Claims, 8 Drawing Sheets

FRAMEWORKS FOR PROVIDING BACKUP FUNCTIONALITIES TO DIFFERENT APPLICATIONS

FIELD

The present disclosure relates generally to storage systems. In an embodiment, the disclosure relates to frameworks for providing backup functionalities to different applications.

BACKGROUND

There are many specialized data management systems that provide various data management functionalities, such as the automation of data backup and restoration of data. Typically, each of these data management systems is closely integrated with a particular application that is supported by the data management system. For example, a data management system that is adapted to manage data used by a messaging application can only work with this particular messaging application and not other applications.

However, it should be appreciated that the data management systems may not support many applications, especially applications that are not in popular use. To provide data management functionalities to such unsupported applications, users create customized scripts. Typically, there is no uniformity between scripts created by different users for the same functionality and accordingly, many of these customized scripts may not be optimized, for example, to execute quickly or to use fewer resources. Furthermore, many of these customized scripts need to be recreated because they are normally not communicated between different users. Therefore, the time spent to recreate scripts that may have already been created can result in a waste of resources.

Additionally, the customized scripts may be stored in different storage locations. For example, a customized script may be located on one user's computer while another customized script may be located on another user's computer. The storage of the scripts in different locations often makes the scripts difficult to access and share between users.

SUMMARY

Generally, examples of frameworks are provided that can provide backup functionalities to different applications. In particular, such frameworks can incorporate various plug-in modules that are adapted to interface with different applications. For example, a framework can include a plug-in module that is adapted to interface with a particular database application. The same framework can also include a different plug-in module that is adapted to interface with, for example, a messaging application.

To provide a backup functionality to a particular application, a system with this framework simply selects an appropriate plug-in module adapted to interface with this particular application. For example, before a backup can be created, the application is quiesced to place the application in a state that is ready to accept the backing up of the data. Accordingly, as part of the interface, the selected plug-in module has scripts that may be executed to quiesce the particular application. After the particular application is quiesced using this selected plug-in module, the backing up of the data or other backup functionalities may then be initiated.

Given that this framework can incorporate different plug-in modules that are adapted to interface with different applications, a single system with this framework may, for example, interface a number of different existing applications and also has the flexibility to accommodate new applications if the appropriate plug-in modules are provided. As such, a single system may provide backup functionalities to different applications. The plug-in modules may also, for example, provide a uniform standard for the scripts because the same plug-in module (or scripts in included in the module) may be used by different users or systems to interface with a particular application.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

The description that follows includes illustrative systems, methods, techniques, instruction sequences, and computing machine program products that embody the present invention. In the following description, for purposes of explanation, numerous specific details are set forth in order to provide an understanding of various embodiments of the inventive subject matter. It will be evident, however, to one skilled in the art that embodiments of the inventive subject matter may be practiced without these specific details. In general, well-known instruction instances, protocols, structures and techniques have not been shown in detail.

Figure 1:
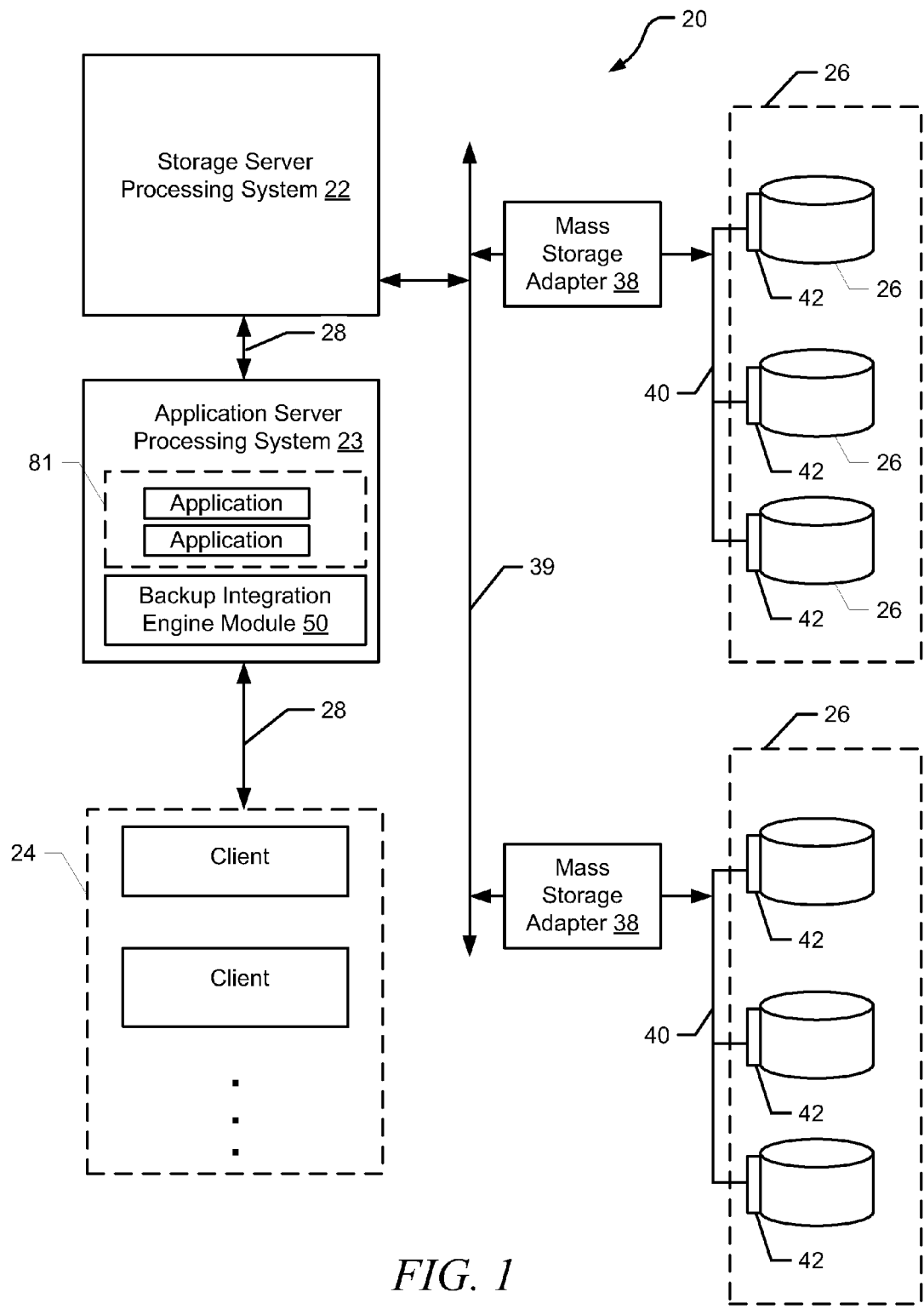
FIG. 1 depicts a block diagram of a storage system, consistent with one of many embodiments of the present invention.

FIG. 1 depicts a block diagram of a storage system 20, consistent with one of many embodiments of the present invention. The storage system 20 includes a storage server processing system 22 (or storage server 22), an application server processing system 23 (or application server 23), and multiple client processing systems 24 (each a "client"). The servers 22 and 23 communicate data between data storage devices 26 and clients 24 in input/output (I/O) operations. Generally, the servers 22 and 23 and clients 24 function in a server-client mass data storage communication relationship with the data storage devices 26.

In one example, the application server 23 executes or hosts one or more applications 81. As used herein, an "application" refers to a program or piece of software designed to perform a specific function. Examples of applications 81 include database management systems, message servers, collaboration applications, process management applications, document management applications, and other applications. In I/O operations, applications 81 hosted on the application server 23 transmit read and write requests to, for example, the storage server 22. The data communicated in the I/O operations is transferred between the storage server 22 and the application server 23 by a computer network communication link 28, which also connects the application server 23 to the clients 24. It should be appreciated that a variety of computer network protocols are used to transfer data between the servers 22 and 23 and the clients 24 over the communication link 28. These protocols include, for example, Fibre Channel Protocol (FCP), Ethernet, and Internet Small Computer System Interface Protocol (iSCSI).

The application server 23 may also be configured to execute or host a backup integration engine module 50. In general, the backup integration engine module 50 is included in a framework that provides various backup functionalities to different applications. A "backup functionality," refers to any suitable functionality that results in or operates on a data backup, which refers to a copy of the data. An example of a backup functionality is a backing up of data. Another example of a backup functionality includes the restoration of a data backup. As used herein, a "backing up" of or "to backup" data generally refers to the process of creating a copy of the data (or a data backup). As explained in more detail below, the framework is adapted to incorporate or interact with various plug-in modules to interface with each of the applications 81.

The storage server 22 is particularly configured to perform I/O operations between the servers 22 and 23 and the data storage devices 26, and to perform various data management functions on the data storage devices 26, among other operations. The mass storage adapter 38 is connected to a data bus 39, and the mass storage adapter 38 receives the I/O commands from the storage server 22. In response, the mass storage adapter 38 causes the data storage devices 26 to act and respond accordingly, either by executing a read command in which data previously written or stored on the data storage devices 26 by the applications 81 is read and supplied to the storage server 22, or by executing a write command in which data from the applications 81 is written to or stored on the data storage devices 26.

It should be noted that groups of data storage devices 26 are connected by a separate bus 40 to the mass storage adapter 38. Each data storage device 26 includes a controller 42 that causes the data storage device 26 to perform in accordance with normal data storage functionalities and to perform I/O commands delivered to it by the mass storage adapter 38. The data storage devices 26 depicted in FIG. 1 are embodied in separate devices from the servers 22 and 23 and the clients 24. However, the data storage devices 26 may alternatively be embodied within the storage server 22, application server 23, and/or each of the clients 24.

Figure 2:
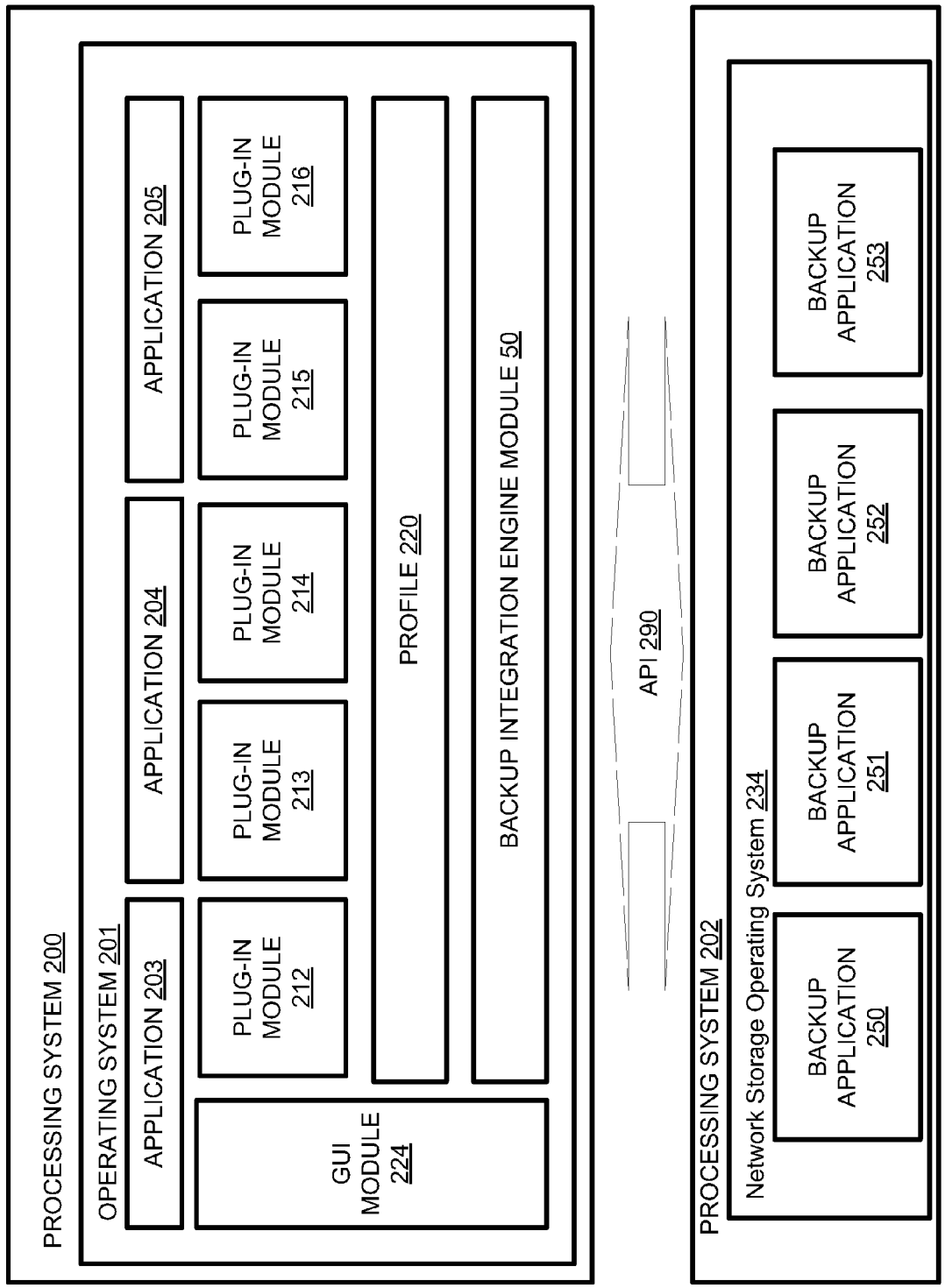
FIG. 2 depicts a block diagram of the various modules that may be included in one or more processing systems that provide various backup functionalities to different applications, in accordance with an embodiment of the present invention.

FIG. 2 depicts a block diagram of the various modules that may be included in one or more processing systems 200 and 202 that provide various backup functionalities to different applications, in accordance with an embodiment of the present invention. It should be appreciated that the processing systems 200 and/or 202 may be deployed in the form of, for example, a network attached storage device, a server computer, a personal computer, a laptop computer, a tablet personal computer, and/or other processing systems. The processing systems 200 and 202 may be included in a storage environment, such as the storage system 20 depicted in FIG. 1. Referring to FIG. 2, in various embodiments, the processing systems 200 and 202 may be used to implement computer programs, logic, applications, methods, processes, or software to backup data associated with different applications, as described in more detail below.

In the embodiment depicted in FIG. 2, the processing system 200 and other processing system 202 execute an operating system 201 and a network storage operating system 234, respectively. The operating system 201 manages various data, hardware resources, and software processes executed on the processing system 200. Some processes and data include applications 203-205, plug-in modules 212-216, a profile 220, a backup integration engine module 50, and a graphic user interface (GUI) module 224. Similarly, the network storage operating system 234 also manages various data, hardware resources, and software processes executed on the processing system 202. However, the network storage operating system 234 is specially optimized for storage functions, such as performing I/O commands and providing backup functionalities. Some of these software processes managed by the network storage operating system 234 include backup applications 250-253 designed to provide backup functionalities.

The applications 203-205 access different data, which, as discussed above, may be stored at different locations from the processing system 200. In particular, each application 203, 204, or 205 has or operates on its own set of data. The data may include structured data (e.g., data stored in database tables and arrays) and unstructured data (e.g., an image file, a binary file, and a natural language text file).

Given that each application 203, 204, or 205 functions differently, embodiments of the present invention provide frameworks that can incorporate or interact with various plug-in modules 212-216. A "plug-in module," such as plug-in module 212, 213, 214, 215, or 216, refers to a program that interfaces with a host application (e.g., backup integration engine module 50) to extend, modify, and/or enhance the capabilities or functionalities of the host application. The plug-in modules 212-216 effectively depend on the host application and may not function independently without the host application. Each plug-in module 212, 213, 214, 215, or 216 is particularly adapted or configured to interface with one or more applications 203, 204, and 205.

The backup integration engine module 50 is adapted to interface with all plug-in modules 212-216 and further adapted to select or load the appropriate plug-in module 212, 213, 214, 215, and/or 216 to interface with a particular application 203, 204, or 205. Additionally, the backup integration engine module 50 may also provide backup functionalities. With the plug-in modules 212-216 being able to interface with different applications 203-205, such interface enables backing up of various data accessed by the different applications 203-205. As explained in more detail below, the profile 220 includes various settings, such as the selection of the appropriate plug-in module 212, 213, 214, 215, and/or 216. The GUI module 224 provides an interface to input various parameters and scripts into the profile 220, as also described in more detail below.

Still referring to FIG. 2, to provide the backup functionalities, the backup integration engine module 50 may select or load one or more backup applications 250-253, which are managed by the network storage operating system 234, that provide various backup functionalities. Examples of backup applications 250-253 will be described in more detail below. The backup integration engine module 50 can communicate with each of the backup applications 250 through an application programming interface (API) 290. In one example, the API 290 may provide for marshalling of API name and input parameters using XML (eXtensible markup language), with input parameters being typed and the contents of the XML being independent of the programming language and architecture on both client and server sides of a transaction.

It should be appreciated that in other embodiments, the system depicted in FIG. 2 may include fewer, more, or different modules, applications, and processing systems apart from those shown in FIG. 2. For example, in an alternative embodiment, the backup integration engine module 50, the plug-in modules 212-216, and backup applications 250-253 may be executed or hosted on a single processing system, such as the storage server processing system 22 depicted in FIG. 1. In yet another embodiment, the GUI module 224 may be excluded because the various data included in a profile 220 may be inputted using a text editor, rather than through a GUI as provided by the GUI module 224.

Figure 3:
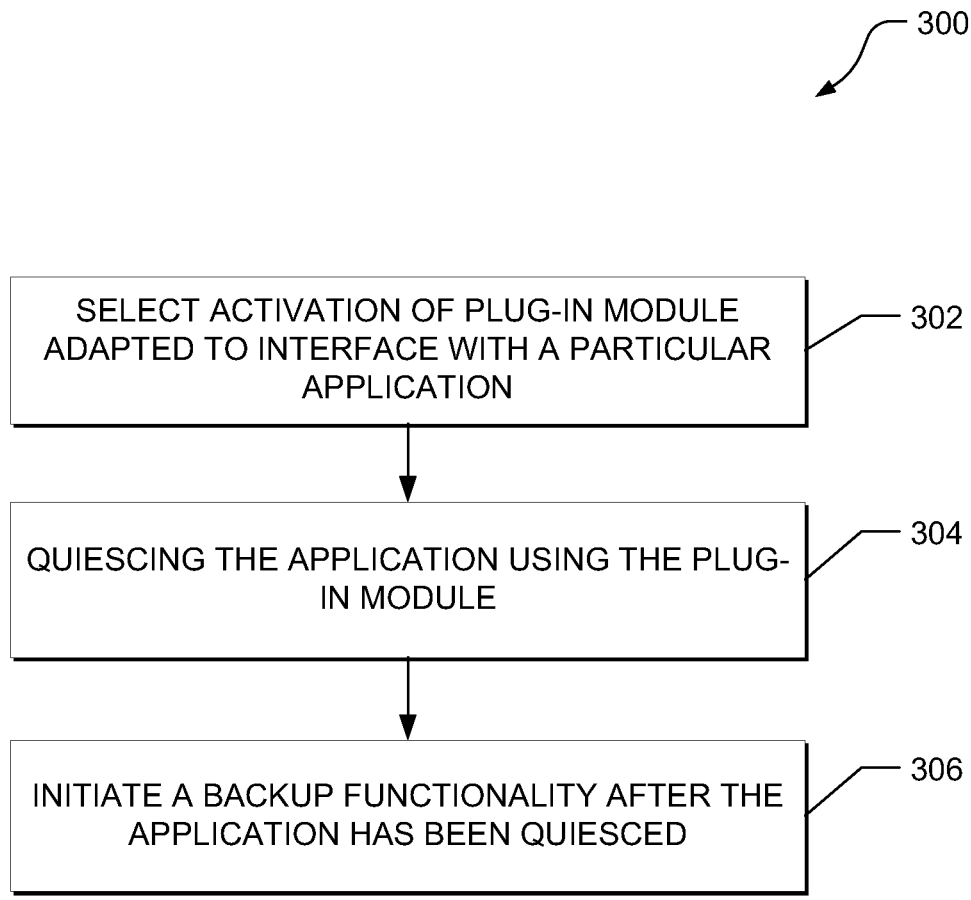
FIG. 3 depicts a flow diagram of a general overview of a method, in accordance with an embodiment, to provide backup functionalities.

FIG. 3 depicts a flow diagram of a general overview of a method 300, in accordance with an embodiment, to provide backup functionalities. In an embodiment, the method 300 may be implemented by the backup integration engine module 50 and employed in the processing system 200 of FIG. 2. A framework is provided that includes a variety of plug-in modules, with each module adapted to interface with one or more applications. Here, a backup functionality is to be provided to a particular application. For example, a backup of data associated with a particular application can be created. In another example, a data backup associated with a particular application can be restored. As depicted in FIG. 3, a plug-in module that is adapted to interface with this particular application is selected for activation at 302. The backup integration engine module, for example, can automatically select the appropriate plug-in module for activation based on predefined instructions. In one embodiment, as explained in more detail below, the selection may be specified or defined in a profile.

After a particular plug-in module is selected for activation, the application is quiesced using the plug-in module at 304. As used herein, "quiescing" an application is to place the application in a state ready to accept a backup functionality. In particular, an application is quiesced when it is placed in a special mode that allows the backup functionality to be implemented. It should be appreciated that the state for one application may be different for another application. As a result, quiescing an application may be unique to each application. Accordingly, there is a variety of different techniques to quiesce an application. In one example of quiescing a database management system, a connection is first made to the database management system. Thereafter, the database management system may be instructed to place all its database tables, which store the data, into read-only mode where data can be read but not written to the database tables. This placement of the database tables in read-only mode may, for example, prevent data corruption during a backup process. Other examples of quiescing the application include preventing users from connecting to the application, locking all users out of a database table or other structured data, disallowing new resources from being made available, preventing any modification of data, disabling the application itself (e.g., shutdown application and place application in sleep mode), allowing current active transactions to complete and then flushing modified buffers from cache to another database table, reinitiating or restarting an application, modifying a file system, and other operations.

After the application has been quiesced, the backup functionality is initiated at 306. As discussed above, one or more backup applications may be selected to provide this backup functionality. Accordingly, in one embodiment, the initiation of the backup functionality involves the execution of one or more of these backup applications, as explained in more detail below. In an alternate embodiment, the backup integration engine module itself or even the plug-in modules included in the framework may directly provide this backup functionality.

Figure 4:
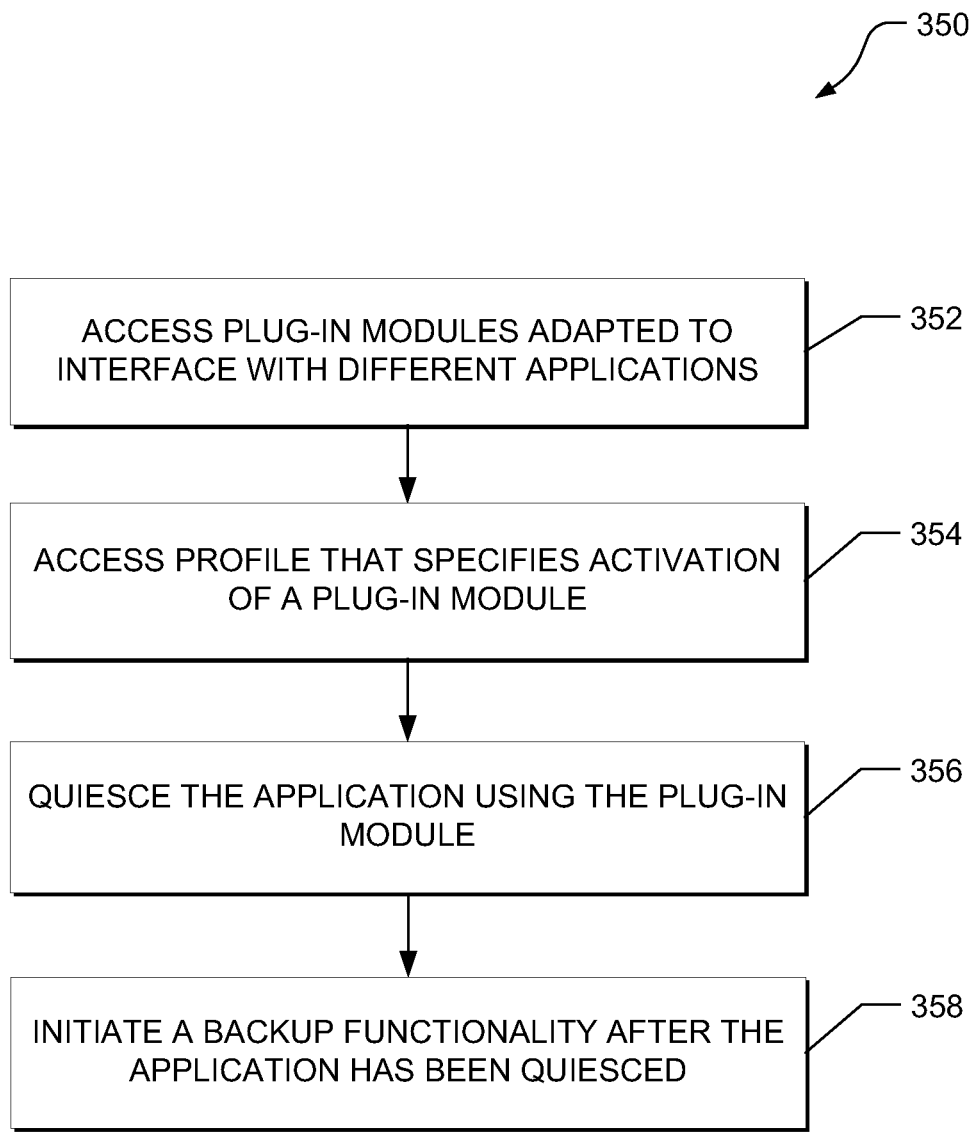
FIG. 4 depicts a flow diagram of a general overview of an another method, in accordance with an alternate embodiment, to provide backup functionalities.

FIG. 4 depicts a flow diagram of a general overview of an another method 350, in accordance with an alternate embodiment, to provide backup functionalities. Similarly, in an embodiment, the method 350 may be implemented by the backup integration engine module 50 and employed in the processing system 200 of FIG. 2. As depicted at 352 of FIG. 4, multiple plug-in modules are accessed from a framework where the plug-in modules are adapted to interface with different applications. For example, a plug-in module is adapted to interface with a particular application while another plug-in module is adapted to interface with a different application.

A profile is also accessed at 354. This profile may, for example, be a control file (e.g., a text file) that can be used to customize the behavior of a backup integration engine module and/or the backup process. This profile includes various parameters, commands, instructions, and/or other data. Here, the profile specifies activation of at least one of the plug-in modules to interface with a particular application where a backup functionality is to be provided to this particular application. The application is then quiesced at 356 using the plug-in application and thereafter, the backup functionality is initiated at 358 after the application has been quiesced.

Figure 5:
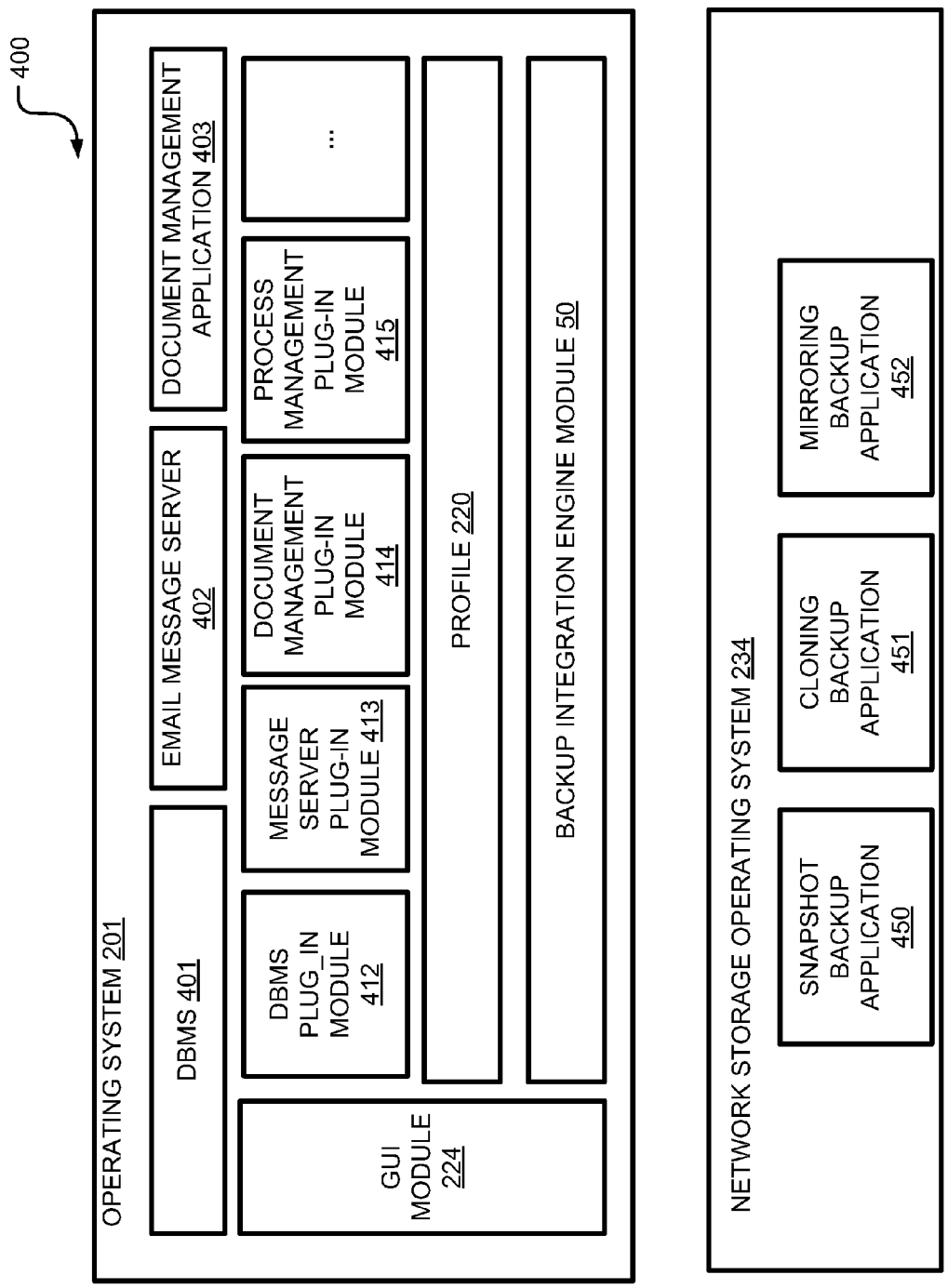
FIG. 5 depicts a block diagram of an example of a framework, in accordance with an embodiment, for providing backup functionalities to different applications.

FIG. 5 depicts a block diagram of an example of a framework 400, in accordance with an embodiment, for providing backup functionalities to different applications. In this example, the software processes and/or services managed by the operating system 201 include applications 401-403 (e.g., a database management system 401, an email message server application 402, and a document management application 403) and various plug-in modules 412-415 adapted to interface with the applications (e.g., a database management system plug-in module 412, a message server plug-in module 413, a document management plug-in module 414, and a process management plug-in module 415). The framework 400 also includes a profile 220 and a GUI module 224. The network storage operating system 234 includes backup applications 450-452 that provide various backup functionalities. Examples of such backup applications include snapshot backup application 450, cloning backup application 451, and mirroring backup application 452.

For example, before a backing up of data is initiated, one or more applications 401-403 are quiesced. In this example, each plug-in module 412, 413, 414, or 415 is adapted to interface with a particular application 401, 402, or 403. In particular, the DBMS plug-in module 412 is adapted to interface with the DBMS 401. The message server plug-in module 413 is adapted to interface with the email message server 402. The document management plug-in module 414 is adapted to interface with the document management application 403.

Each plug-in module 412, 413, 414, or 415 includes one or more scripts that quiesce one of the applications 401, 402, or 403. As used herein, a "script" refers to a program with one or more instructions, commands, parameters, and/or other data that control one or more applications 401-403. A script may, for example, refer to a single command, a single instruction, a set of commands, or a set of instructions. To quiesce one application 401, 402, or 403, the backup integration engine module 50 executes a particular script included in the appropriate plug-in module 412, 413, 414, or 415 that, when executed, quiesces an application 401, 402, or 403. For example, before initiating a backing up of data associated with the DBMS 401, the backup integration engine module 50 selects activation of the DBMS plug-in module 412 and quiesces the DBMS 401 by executing the script included in the DBMS module 412. In another example, before initiating a backing up of data associated with the email message server 402, the backup integration engine module 50 selects activation of the message server plug-in module 413 and quiesces the email message server 402 by executing the script included in the message server plug-in module 413.

In one embodiment, the selection of the particular plug-in module 412, 413, 414, or 415 is specified in the profile 220. Here, the profile 220 may, for example, may be automatically read by the backup integration engine module 50 that can be used to customize the behavior of the backup integration engine module 50 and/or the backup process. The user may input or specify data in the profile 220 through the use of a GUI generated by the GUI module 224. An example of this GUI may include checkboxes, text boxes, buttons, or other input mechanisms to accept the input of data included in the profile 220. In addition to instructions or other data specifying the selection of an appropriate plug-in module 412, 413, 414, or 415 to interface with one or more applications 401-403, the profile 220 may also include other instructions, commands, parameters, and/or other data to define other functionalities, as explained in more detail below.

After a particular application 401, 402, or 403 is quiesced, the backup integration engine module 50 initiates a backing up of the data associated with the particular application 401, 402, or 403. It should be appreciated that there are a variety of different types of backup, such as a snapshot, a clone, and a mirror, and the backup integration engine module 50 can select one or more backup applications 450-452 to create these different types of backup or provide other backup functionalities.

For example, the snapshot backup application 450 can take a snapshot of the data associated with one or more applications 401-403. A snapshot is an instant copy within a file system. Such a snapshot can practically, for example, copy large amounts of data in a few seconds. More particularly, a snapshot is a space conservative, point-in-time, and read-only image of data accessible by name that provides a consistent image of that data (such as a storage system) at some previous time. A snapshot is a point-in-time representation of a storage element, such as an active file system, file or database, stored on a persistent storage device and having a name or other identifier that distinguishes it from other snapshots taken at other points in time. In a write-anywhere file system, a snapshot is an active file system image that contains complete information about the file system, including all suitable metadata.

The cloning backup application 451 creates a clone of the data associated with one or more applications 401-403. A "clone" is a modifiable copy created from a snapshot. It should be appreciated that since the modifiable copy is created from a snapshot, the modifiable copy may therefore a near-instantaneous, space efficient, and, in an example embodiment, a writable "clone" of the snapshot, which shares the same physical blocks with the baseline file system. When the snapshot and the modifiable copy diverge (e.g., due to continuing updates in the production database or development changes to a modifiable copy of the database), the divergent blocks are separately stored. Since the creation of a modifiable copy from a snapshot is near instantaneous, such replication technique may result in minimal downtime of the accessibility of the data.

The mirror backup application 452 can create a mirror of the data based on the snapshot. A mirror is an exact copy of a data set. Here, the data is mirrored onto the secondary storage system to ensure, for example, that the primary copy is kept up-to-date with the data. Mirroring can be synchronous, where, for example, a block of the data written to the primary storage system is also immediately transmitted to the secondary storage system. In asynchronous mirroring, the block of data written to the primary storage system is transmitted to the secondary storage system at a later time.

Still referring to FIG. 5, it should be appreciated that the backup integration engine module 50 may execute multiple backup applications 450-452 either simultaneously or one after another. For example, as discussed above, both the clone and mirror of data are based on a snapshot. Thus, to clone the data, the backup integration engine module 50 executes the snapshot backup application 450 to take a snapshot of the data. Afterwards, the backup integration engine module 50 executes the cloning backup application 451 to create a clone of the data based on the snapshot. In another example, after the execution of the snapshot backup application 450, the backup integration engine module 50 may execute the mirroring backup application 452 to create a mirror of the data on a secondary storage system based on the snapshot of the data.

By being able to interface with different plug-in modules 412-415, the framework 400 can provide backup functionalities to different applications 401-403. As a result, the framework 400 can, for example, accommodate new or additional applications different from the applications 401-403 depicted in FIG. 5 with the addition of new plug-in modules that are adapted to interface with these new or additional applications.

Figure 6:
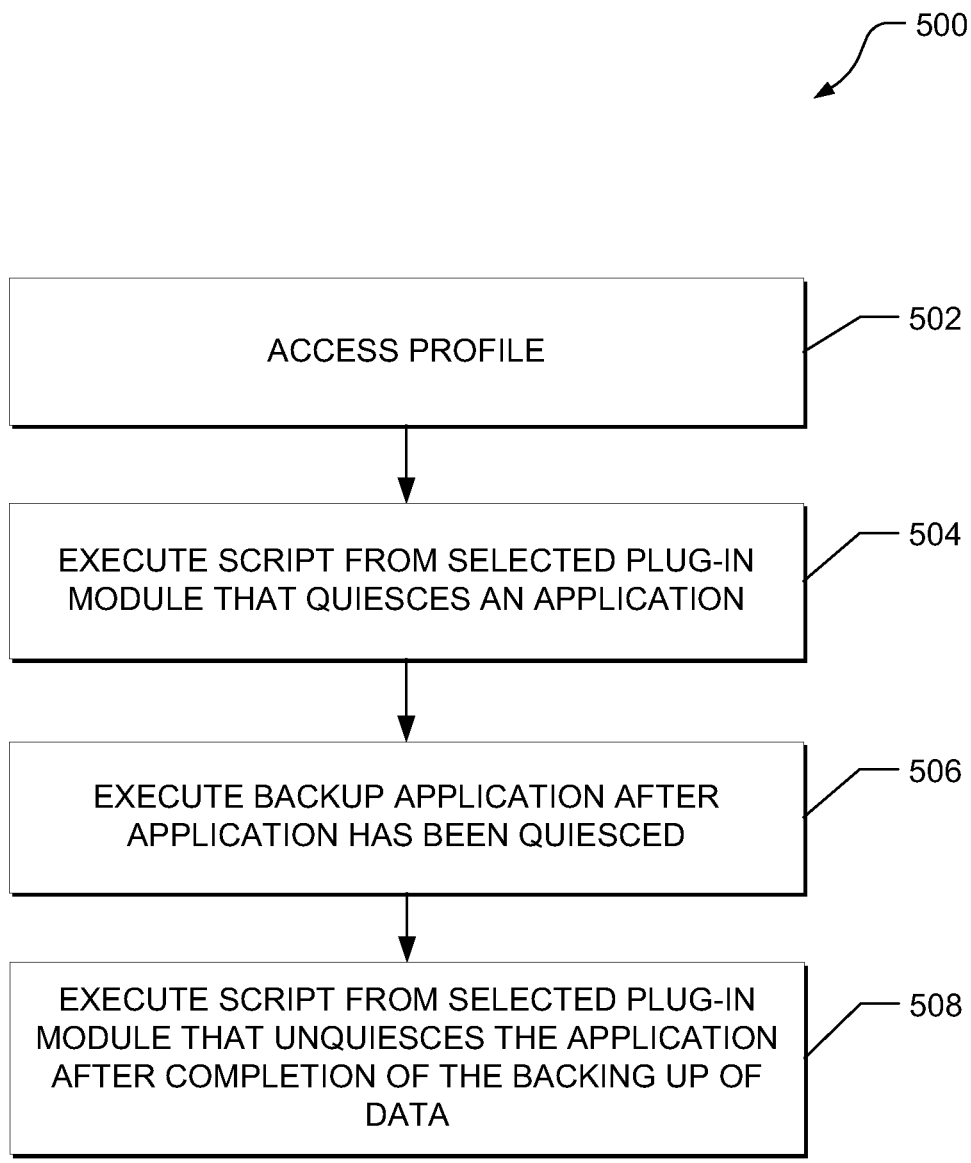
FIG. 6 depicts a flow diagram of a detailed method, in accordance with alternative specific embodiment, for backing up of data.

FIG. 6 depicts a flow diagram of a detailed method 500, in accordance with specific embodiment, for backing up of data. Similarly, the detailed method 500 may be implemented by the backup integration engine module 50 and employed in the processing system 200 of FIG. 2. As depicted in FIG. 6, a profile is initially accessed at 502. The access of a particular profile may include, for example, reading a control file. This profile specifies the selection of one or more plug-in modules to interface with their respective applications. In turn, the selected plug-in module includes at least one script (or "first" script) that quiesces an application. Additionally, the plug-in module may include another script (or "second" script) that unquiesces the application. As used herein, "unquiescing" an application refers to reverting a state of the application to a previous state before quiescing the application. As an example, such a previous state may refer to an application's normal mode or state of operation.

The first script from the selected plug-in module is then executed at 504 to quiesce the application and afterwards, one or more backup applications may be executed at 506 to backup the data. It should be noted that in one embodiment, the profile may define or specify a particular backup application to execute. In an alternate embodiment, the selection of the backup application may be predefined by, for example, the backup integration engine module.

After the backing up is completed, the application may be unquiesced using the same plug-in module. The application may be unquiesced such that, for example, it can modify the data or add new data without risking data corruption from a backup operation. To unquiesce this application, the second script, which unquiesces the application, may be executed at 508 after the completion of the backing up of data.

Figure 7:
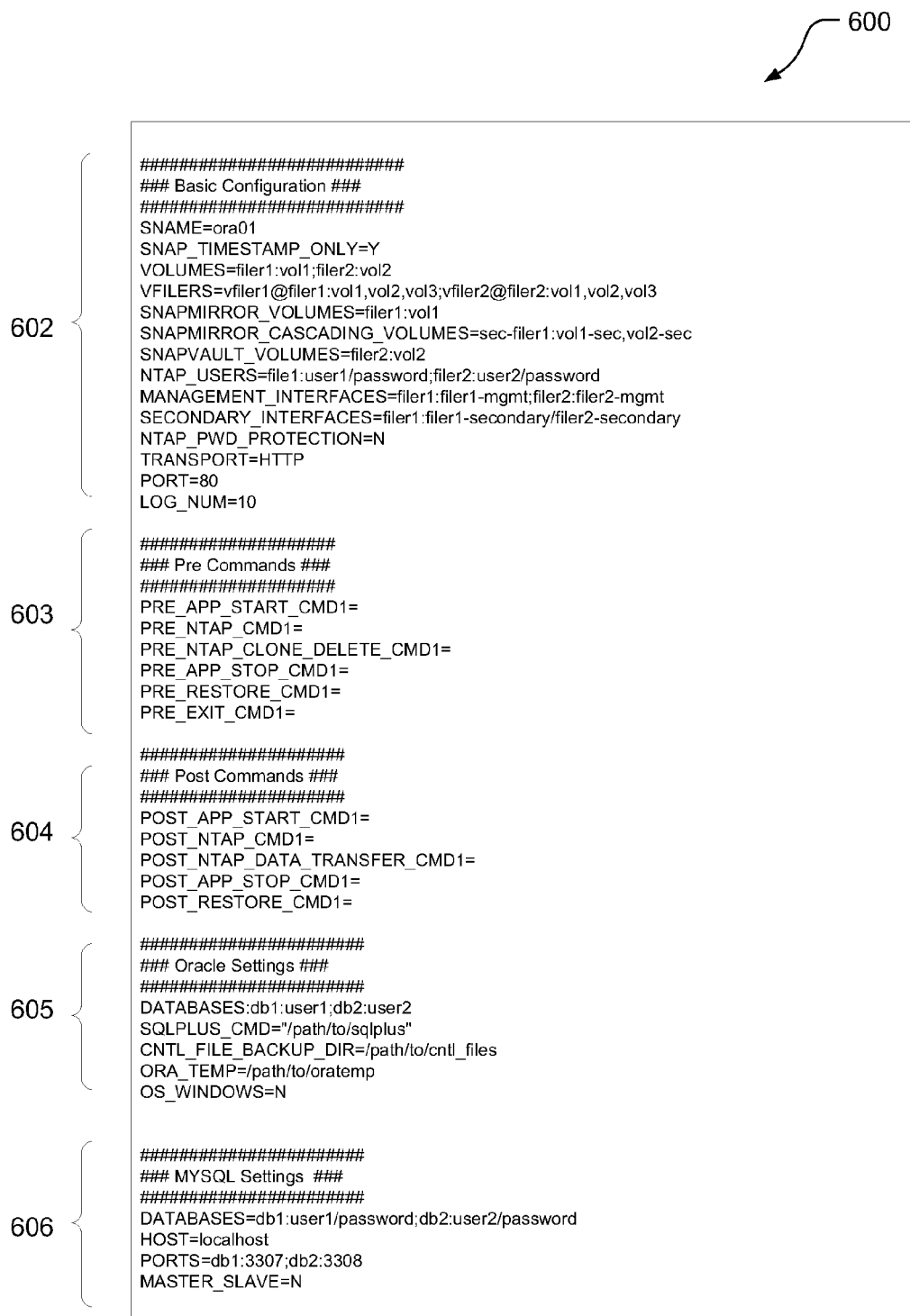
FIG. 7 depicts an example of a profile in the form of a control file, in accordance with an embodiment of the present invention.

FIG. 7 depicts an example of a profile 600 in the form of a control file, in accordance with an embodiment of the present invention. The profile 600 includes various parameters, commands, instructions, and other data that define the settings of a backup process (or the backing up of data). In addition to the selection of particular plug-in modules, the profile 600 may also include or specify a variety of other settings. For example, as depicted in FIG. 7, the portion 602 of profile 600 includes various configurations and parameters used in the backing up of data, such as volumes, port numbers, passwords, and retention policies. The portion 602 also defines the various backup applications that may be activated or inactivated in the backup process and also defines the order of execution of the backup applications.

Additionally, the portions 605 and 606 define the various parameters for each different plug-in module. For example, portion 605 defines the various settings for a plug-in module that is adapted to interface with an ORACLE database management system. Portion 606 defines the various settings for a plug-in module that is adapted to interface with a MYSQL database management system.

The profile 600 may also define additional commands or instructions that may be executed at any suitable stage during the backup process. For example, portion 603 of the profile 600 includes a set of commands (or "pre-commands") that is executed before initiation of the backup process (e.g., before execution of the backup applications). Portion 604 of the profile 600 includes another set of commands (or "post commands") that is executed after a completion of the backup process. The profile 600 may also include additional commands (not shown) that are executed during the backup process (e.g., executed in parallel with the execution of the backup applications). It should be appreciated that these commands (pre-commands, post commands, or other commands) may, for example, be independent of the plug-in modules and/or backup applications. In other words, the profile 600 may include commands and instructions that are not included in the plug-in modules and/or backup applications. In view of the various parameters, instructions, commands, and/or other data that may be included in the profile 600, the profile 600 may, in one example, allow a user to customize and define a unique backup process.

Figure 8:
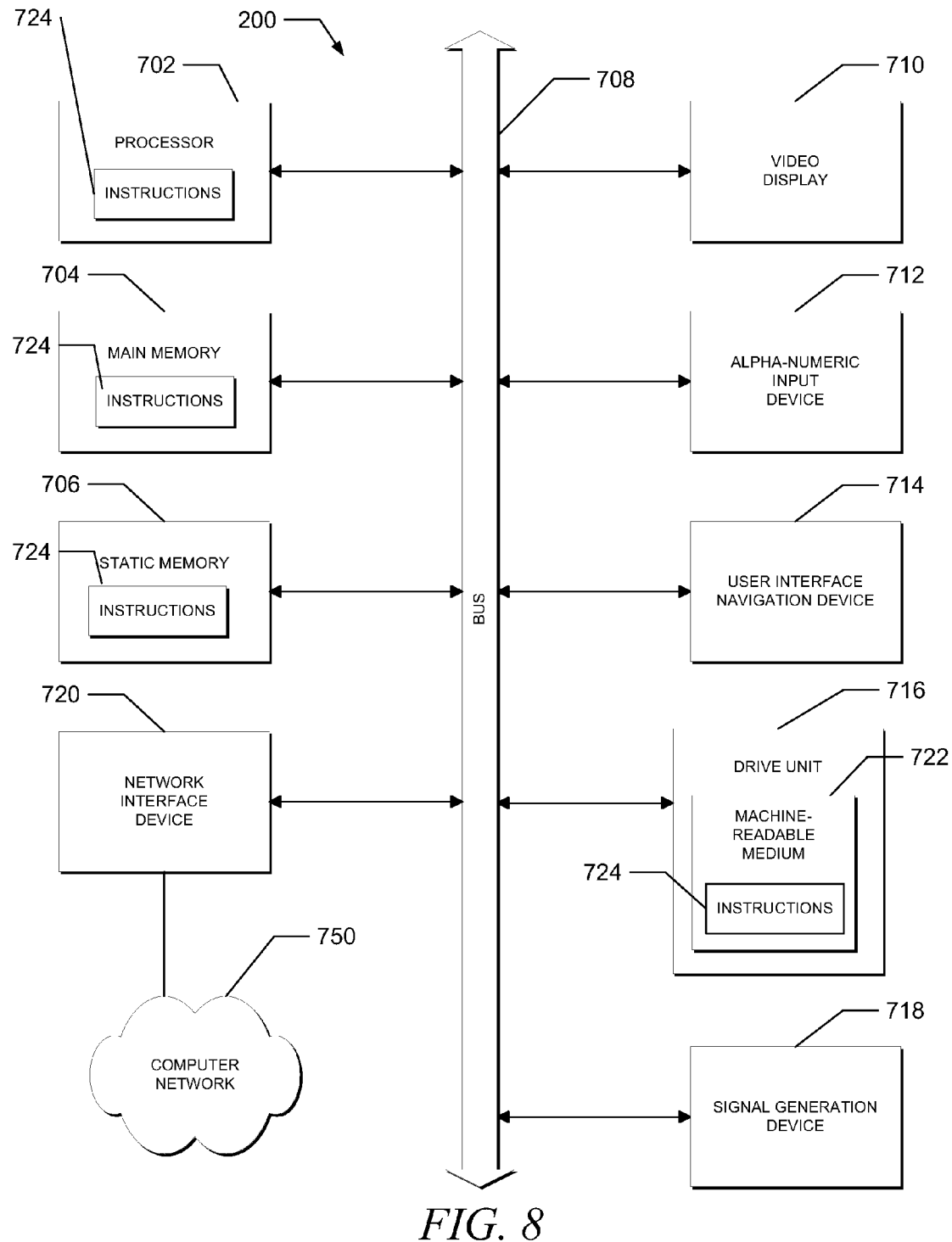
FIG. 8 depicts a block diagram of a machine in the example form of a processing system within which may be executed a set of instructions for causing the machine to perform any one or more of the methodologies discussed herein.

FIG. 8 depicts a block diagram of a machine in the example form of a processing system 200 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 200 includes a processor 702 (e.g., a central processing unit (CPU), a graphics processing unit (GPU) or both), a main memory 704 (e.g., random access memory), and static memory 706 (e.g., static random-access memory), which communicate with each other via bus 708. The processing system 200 may further include video display unit 710 (e.g., a plasma display, a liquid crystal display (LCD) or a cathode ray tube (CRT)). The processing system 200 also includes an alphanumeric input device 712 (e.g., a keyboard), a user interface (UI) navigation device 714 (e.g., a mouse), a disk drive unit 716, a signal generation device 718 (e.g., a speaker), and a network interface device 720.

The disk drive unit 716 (a type of non-volatile memory storage) includes a machine-readable medium 722 on which is stored one or more sets of data structures and instructions 724 (e.g., software) embodying or utilized by any one or more of the methodologies or functions described herein. The data structures and instructions 724 may also reside, completely or at least partially, within the main memory 704 and/or within the processor 702 during execution thereof by processing system 200, with the main memory 704 and processor 702 also constituting machine-readable, tangible media.

The data structures and instructions 724 may further be transmitted or received over a computer network 750 via network interface device 720 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the processing system 200) or one or more hardware modules of a computer system (e.g., a processor 702 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 702 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 702 configured using software, the general-purpose processor 702 may be configured as respective different hardware modules at different times. Software may accordingly configure a processor 702, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation, and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 702 that are temporarily configured (e.g., by software) or permanently configured to perform the relevant operations. Whether temporarily or permanently configured, such processors 702 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 702 or processor-implemented modules. The performance of certain of the operations may be distributed among the one or more processors 702, not only residing within a single machine, but deployed across a number of machines. In some example embodiments, the processors 702 may be located in a single location (e.g., within a home environment, an office environment or as a server farm), while in other embodiments the processors 702 may be distributed across a number of locations.

While the embodiment(s) is (are) described with reference to various implementations and exploitations, it will be understood that these embodiments are illustrative and that the scope of the embodiment(s) is not limited to them. In general, techniques for creating backups of data may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A processing system, comprising:
   at least one processor to operate a plurality of different applications; and
   a machine-readable medium in communication with the at least one processor, the machine-readable medium storing a plurality of backup applications, the plurality of different applications, and instructions that, when executed by the at least one processor, cause the at least one processor to perform operations comprising:
   accessing a profile that (i) identifies one or more backup applications from the plurality of backup applications to be used in a backup process and an order of execution of the one or more backup applications in the backup process, and (ii) identifies a plurality of plug-in modules to use for the backup process, each plug-in module from the plurality of plug-in modules being configured to interface with a corresponding application from the plurality of different applications;
   quiescing multiple applications from the plurality of different applications, including using the plug-in module corresponding to each of the multiple applications to place that application in a state ready to accept a backup functionality;
   after each of the multiple applications has been quiesced, (i) selecting the one or more backup applications based on the profile, and (ii) executing the one or more backup applications to perform the backup functionality for each of the multiple applications based on the profile, wherein executing the one or more backup applications includes executing a first backup application to create a snapshot of data associated with each of the multiple applications and executing a second backup application to create a copy of the data based on the snapshot; and
   unquiescing each of the multiple applications after the backup functionality for each of the multiple applications is complete by using the plug-in module corresponding to each of the multiple applications.

2. The processing system of claim 1, wherein the profile corresponds to a control file that includes one or more parameters.

3. The processing system of claim 2, wherein the one or more parameters includes at least one of volume information, port numbers, passwords, or retention policies.

4. A method of performing a backup process, the method comprising:
   accessing a plurality of plug-in modules that interface with a plurality of different applications;
   accessing a profile that (i) identifies one or more backup applications from a plurality of backup applications to be used in the backup process and an order of execution of the one or more backup applications in the backup process, and (ii) specifies activation of one or more plug-in modules to use for the backup process, each plug-in module from the one or more plug-in modules being configured to interface with a corresponding application from the plurality of different applications;
   quiescing multiple applications from the plurality of different applications, including using the plug-in module corresponding to each of the multiple applications to place that application in a state ready to accept a backup functionality;
   after each of the multiple applications have been quiesced, (i) selecting the one or more backup applications based on the profile, and (ii) executing the one or more backup applications to perform the backup functionality for each of the multiple applications based on the profile, wherein executing the one or more backup applications includes executing a first backup application to create a snapshot of data associated with each of the multiple applications and executing a second backup application to create a copy of the data based on the snapshot; and
   unquiescing each of the multiple applications after the backup functionality for each of the multiple applications is complete by using the plug-in module corresponding to each of the multiple applications.

5. The method of claim 4, wherein quiescing the multiple applications includes, for each of the multiple applications, executing a first script from the plug-in module to quiesce the corresponding application, and wherein unquiescing each of the multiple applications includes, for each of the multiple applications, executing a second script from the plug-in module to unquiesce the corresponding application.

6. The method of claim 4, wherein the backup functionality includes backing up data associated with one or more of the multiple applications.

7. The method of claim 4, wherein the backup functionality includes restoring data from a data backup associated with one or more of the multiple applications.

8. The method of claim 4, wherein the profile includes a first set of commands that are executed before executing the one or more backup applications and a second set of commands that are executed after completing the backup functionality.

9. The method of claim 8, wherein the profile includes a third set of commands that are executed while executing the one or more backup applications.

10. The method of claim 4, wherein quiescing multiple applications includes disabling the multiple applications.

11. A method of performing a backup process, the method comprising:
 accessing a profile that (i) identifies one or more backup applications from a plurality of backup applications to be used in the backup process and an order of execution of the one or more backup applications in the backup process, and (ii) identifies a plug-in module from a plurality of plug-in modules to use for the backup process, each plug-in module from the plurality of plug-in modules being configured to interface with a corresponding application from a plurality of different applications;
 selecting the plug-in module identified from the profile to provide a backup functionality to the corresponding application;
 operating the selected plug-in module to quiesce the corresponding application, so that the corresponding application is in a state ready to accept the backup functionality;
 after the corresponding application has been quiesced, initiating the backup functionality for the corresponding application by (i) selecting the one or more backup applications based on the profile, and (ii) executing the one or more backup applications to perform the backup functionality for corresponding application based on the profile, wherein executing the one or more backup applications includes executing a first backup application to create a snapshot of data associated with the corresponding application and executing a second backup application to create a copy of the data based on the snapshot; and
 operating the selected plug-in module to unquiesce the corresponding application after the backup functionality has completed.

12. The method of claim 11, wherein the profile includes a first set of commands that are executed before executing the one or more backup applications and a second set of commands that are executed after completing the backup functionality.

13. The method of claim 12, wherein quiescing the corresponding application includes executing a first script from the selected plug-in module to quiesce the corresponding application, and wherein unquiescing the corresponding application includes executing a second script from the selected plug-in module to unquiesce the corresponding application.

14. The method of claim 11, wherein selecting the plug-in module includes selecting the plug-in module for a database management application, wherein initiating the backup functionality includes backing up data associated with the database management application of the selected plug-in module, and wherein operating the selected plug-in module to quiesce the corresponding application includes:
 connecting to the database management application using the plug-in module; and
 instructing the database management application to place a database table in a read-only mode using the selected plug-in module.

15. The method of claim 11, further comprising initiating a second backup functionality associated with a different application by selecting another plug-in module.

16. A processing system, comprising:
 at least one processor to operate a plurality of different applications; and
 a machine-readable medium in communication with the at least one processor, the machine-readable medium storing a plurality of backup applications, a plurality of plug-in modules to interface with the plurality of different applications, and instructions that, when executed by the at least one processor, cause the at least one processor to perform operations comprising:
 accessing a profile that (i) identifies one or more backup applications from a plurality of backup applications to be used in a backup process and an order of execution of the one or more backup applications in the backup process, and (ii) identifies a plug-in module from a plurality of plug-in modules to use for the backup process, each plug-in module from the plurality of plug-in modules being configured to interface with a corresponding application from a plurality of different applications;
 selecting the plug-in module identified from the profile to provide a backup functionality to the corresponding application;
 operating the selected plug-in module to quiesce the corresponding application, so that the corresponding application is in a state ready to accept the backup functionality;
 after the corresponding application has been quiesced, initiating the backup functionality for the corresponding application by (i) selecting the one or more backup applications based on the profile, and (ii) executing the one or more backup applications to perform the backup functionality for corresponding application based on the profile, wherein executing the one or more backup applications includes executing a first backup application to create a snapshot of data associated with the corresponding application and executing a second backup application to create a copy of the data based on the snapshot; and
 operating the selected plug-in module to unquiesce the corresponding application after the backup functionality has completed.

17. The processing system of claim 16, wherein the profile corresponds to a control file that includes one or more parameters, the one or more parameters including at least one of volume information, port numbers, passwords, or retention policies.

18. The processing system of claim 17, wherein the operations for quiescing the corresponding application includes executing a first script from the selected plug-in module to quiesce the corresponding application, and wherein the operations for unquiescing the corresponding application includes executing a second script from the selected plug-in module to unquiesce the corresponding application.

19. The processing system of claim 16, wherein the application corresponding to the selected plug-in module is a database management application.

20. The processing system of claim 16, wherein the profile includes a first set of commands that are executed before executing the one or more backup applications and a second set of commands that are executed after completing the backup functionality.

\* \* \* \* \*